(12) United States Patent
Hai

(10) Patent No.: US 6,651,811 B2
(45) Date of Patent: Nov. 25, 2003

(54) ANTI-PILFERAGE DEVICE FOR OPTICAL DISC HOLDER

(75) Inventor: Chi Ching Hai, Mid-Levels (HK)

(73) Assignee: Concord Continental Ltd., Central (HK)

( * ) Notice: Subject to any disclaimer, the term of this patent is extended or adjusted under 35 U.S.C. 154(b) by 16 days.

(21) Appl. No.: 09/863,306

(22) Filed: May 24, 2001

(65) Prior Publication Data

US 2002/0175097 A1 Nov. 28, 2002

(51) Int. Cl.[7] ............................................. B65D 85/57
(52) U.S. Cl. ................................. 206/308.2; 206/308.1
(58) Field of Search ......................... 206/1.5, 303, 307, 206/308.1, 308.2, 310, 387.11, 493, 807; 215/231, 355, 364; 411/500, 501

(56) References Cited

U.S. PATENT DOCUMENTS

| 4,709,813 | A |   | 12/1987 | Wildt |   |
|---|---|---|---|---|---|
| 4,750,618 | A |   | 6/1988 | Schubert |   |
| 4,874,085 | A |   | 10/1989 | Grobecker et al. |   |
| 4,903,829 | A |   | 2/1990 | Clemens |   |
| 5,238,107 | A |   | 8/1993 | Kownacki |   |
| 5,288,560 | A | * | 2/1994 | Sudo et al. | 215/364 |
| 5,402,882 | A | * | 4/1995 | Bandy et al. | 206/310 |
| 5,682,988 | A |   | 11/1997 | Salisbury |   |
| 5,713,463 | A |   | 2/1998 | Lakoski et al. |   |
| 5,772,021 | A | * | 6/1998 | Bolenbaugh et al. | 206/308.1 |
| 5,848,689 | A |   | 12/1998 | Mueller |   |
| 5,894,924 | A |   | 4/1999 | Koch |   |
| 5,896,985 | A |   | 4/1999 | Nakasuji |   |
| 6,021,894 | A |   | 2/2000 | Lakoski et al. |   |
| 6,041,922 | A | * | 3/2000 | Kollinek | 206/308.1 |
| 6,047,821 | A |   | 4/2000 | Hashimoto et al. |   |
| 6,170,656 | B1 | * | 1/2001 | Cerda-Vilaplana et al. | 206/308.1 |
| 6,196,384 | B1 | * | 3/2001 | Belden, Jr. | 206/308.1 |
| 6,237,763 | B1 | * | 5/2001 | Lau | 206/308.1 |
| 6,241,089 | B1 | * | 6/2001 | Grobecker | 206/308.1 |
| 6,283,280 | B1 | * | 9/2001 | Wong et al. | 206/308.1 |
| 6,464,073 | B1 | * | 10/2002 | Tang | 206/308.1 |

FOREIGN PATENT DOCUMENTS

| CN | 1171163 A | 1/1998 |
|---|---|---|
| CN | 2410714 Y | 12/2000 |
| CN | 2415430 Y | 1/2001 |

OTHER PUBLICATIONS

PCT International Search Report for International Application No. PCT/CN02/00353, Aug. 29, 2002.

* cited by examiner

*Primary Examiner*—Jim Foster

(57) ABSTRACT

An anti-pilferage device for securing an optical disc within an optical disc case. The anti-pilferage device functions as a secondary engagement device to engage an optical disc which has been demounted from the mounting hub of the optical disc case.

16 Claims, 2 Drawing Sheets

ANTI-PILFERAGE DEVICE FOR OPTICAL DISC HOLDER

BACKGROUND OF THE INVENTION

This invention relates to storage containers for optical discs such as compact discs (CDs) or digital versatile discs (DVDs).

The term "optical disc" in the context of this specification refers to laser-readable discs for carrying, for example, pre-recorded music, computer software, videos, films, interactive games, or other data.

Optical discs typically include a central aperture that is used to both play the disc and to hold the disc in place during storage. Optical discs are conventionally stored in plastic cases when not in use. Typically, they are also shipped and sold in such cases. Conventional plastic storage cases include a disc-engaging hub centrally disposed within the case that projects through the aperture of the disc and secures the disc in place within the case. The central hub must allow easy disc insertion (so that production efficiency is not jeopardized) and must also allow easy disc release (so that the user is not frustrated). As a result, the central hub typically does not provide totally secure engagement, and the disc can usually be shaken loose from the hub.

In order to deter theft of valuable DVDs and CDs, optical disc holders are often fitted with transponders or magnetic devices that cause an alarm to sound when the holder passes by a checkpoint. Such devices are typically deactivated or removed by store personnel when the disc is purchased. However, such anti-theft devices have encouraged unsavory characters to resort to removing optical discs from closed disc holders at the retail location in order to avoid triggering theft detection equipment at the checkpoint. A large number of optical disc holders in use today, for example, DVD holders, are made of a flexible material such as polypropylene. This allows a person to disengage the disc inside the case by pressing at the center of the cover, because the holder will bend under pressure and therefore transmit the force to the central hub. Thus, it is possible to demount the optical disc from the central hub while the optical disc holder is in a closed position. A disengaged disc can be moved inside the holder through shaking of the holder to the holder's edge, and a person can apply pressure to the holder to create a small slit between the holder's cover and base through which the optical disc can be removed from the closed holder. By exploiting the flexible nature of the optical disc holder, a high-value optical media such as a DVD can be removed from its holder without opening the holder, and without requiring conspicuous movement on the part of the thief.

Unintended disc disengagement inside a holder can also occur during transportation, (for example, as a result of cargo vehicle vibration), or handling at retail outlet, (as a result of dropping). Movement inside a holder subsequent to such unintended disengagement can cause damage such as scratches, particularly to high-density media such as DVDs.

Thus, there is a need for an optical disc holder which includes an anti-pilferage device to prevent an optical disc which becomes disengaged from the hub of a closed holder from moving freely inside of the holder.

SUMMARY OF THE INVENTION

The present invention includes a secondary disc-engaging device for engaging an optical disc after it has become disengaged from a primary engaging device of an optical disc holder, namely, the central hub. The secondary disc-engaging device impedes a disc that has been disengaged from the central mounting hub from being freely moved around inside the holder by indirect forces such as shaking.

According to one aspect of the invention, there is provided an optical disc case for an optical disc having a central mounting aperture, the disc case including a base, a cover movable relative to the base between a closed position in which a storage space for the optical disc is defined between the base and cover, and an open position, a mounting hub on the base receivable in the mounting aperture for engaging the optical disc to mount it within the disc case, and an anti-pilferage device connected to the mounting hub for engaging the optical disc if the optical disc becomes demounted from the mounting hub. The anti-pilferage device has a resilient engagement member spaced apart from the base and extending radially from the mounting hub such that, when the optical disc is mounted on the mounting hub, a portion of the optical disc is positioned between the engagement member and the base.

According to another aspect of the invention, there is provided an anti-pilferage device for securing an optical disc which has a central aperture within an optical holder having a base, a cover movable relative to the base between an open position and a closed position, and a mounting hub on the base receivable in the aperture for engaging the optical disc. The anti-pilferage device includes a shaft for engaging the mounting hub, and an engagement member integrally connected to and extending radially from the shaft, the shaft and engagement member being arranged so that when the shaft is engaged with the mounting hub and an optical disc is mounted on the mounting hub, at least a portion of the optical disc is located between the base and the engagement member.

Further features of the invention, its nature and various advantages will be apparent from the accompanying drawings and the following detailed description of the preferred embodiments.

DETAILED DESCRIPTION OF THE PREFERRED EMBODIMENTS

Figure 1:
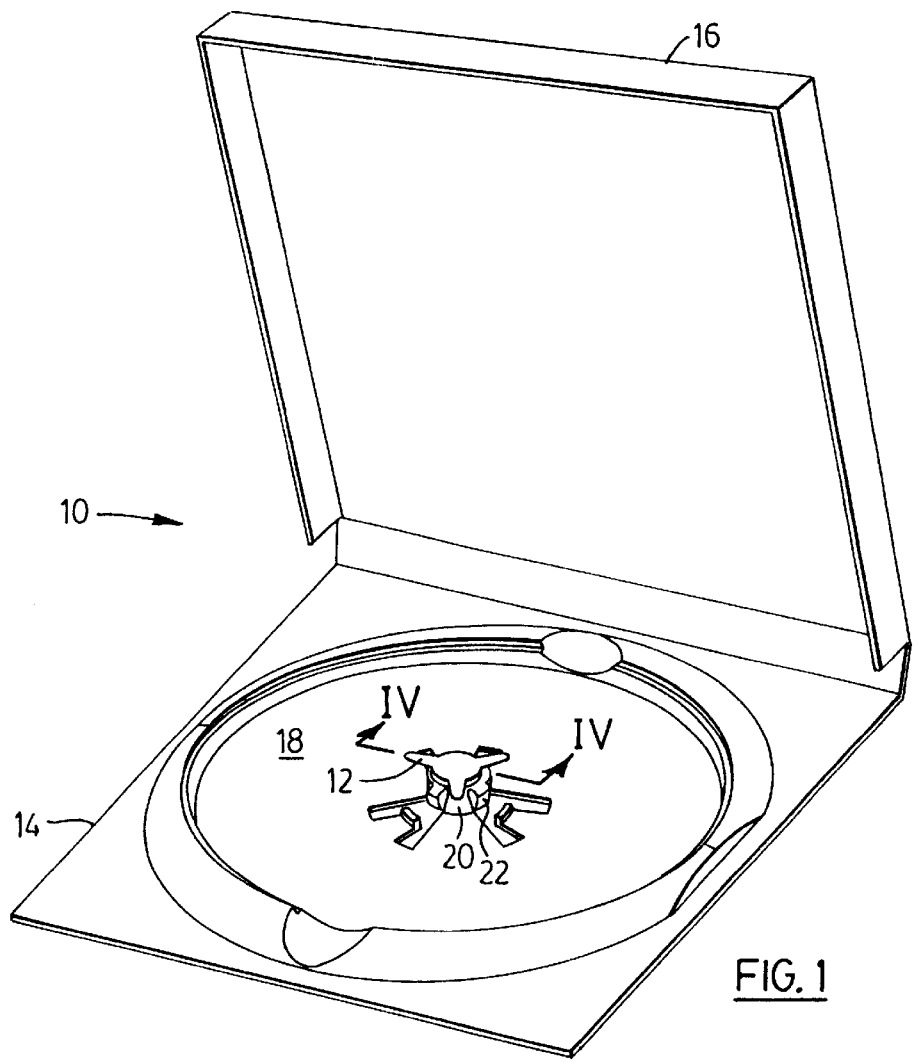
FIG. 1 is a perspective view of an illustrative embodiment of an optical disc holder constructed in accordance with the invention.

With reference to FIG. 1, there is shown an optical disc storage holder or case 10 incorporating an anti-pilferage device 12 in accordance with a preferred embodiment of the invention. The optical disc holder shown in the illustrated embodiment is a clam-shell style holder having a base 14 and a cover 16. As with conventional disc holders, the cover 16 is movable relative to the base 14 between an open position, as is shown in FIG. 1, and a closed position in which a disc storage space 18 is defined between the cover 16 and base 14. A centrally located mounting hub 20 is located on the base 14. The mounting hub is configured to be received within the central aperture of an optical disc and includes a number of locking fingers 22 (only one locking finger is shown in FIG. 1) arranged radially around the mounting hub 20 for engaging an optical disc mounted on the central hub 20. The locking fingers 22 are biased to engage the optical disc about the circumference of its central aperture, thereby securing the optical disc in place on the central hub. Central hub arrangements which use a plurality of locking fingers to secure a disc in place are known in the art. One example of a mounting hub having a plurality of locking fingers can be seen in U.S. Pat. No. 6,085,900 which has been assigned to the assignee of the present invention. A different type of hub structure which is quite common is a hub that is formed by a plurality of inwardly-extending arms that are fixed to the base at the outer ends. At the inner ends, the arms extend upwardly away from the base portion of the case to which the outer ends of the arms are secured, to form a disc-engaging hub that fits within the central aperture of the disc. An example of such a hub can be seen in U.S. Pat. No. 5,894,924. In the present invention, many different configurations are possible for central hub 20, so long as the central hub 20 serves as primary engagement device for securing an optical disc within the disc holder.

Figure 2:
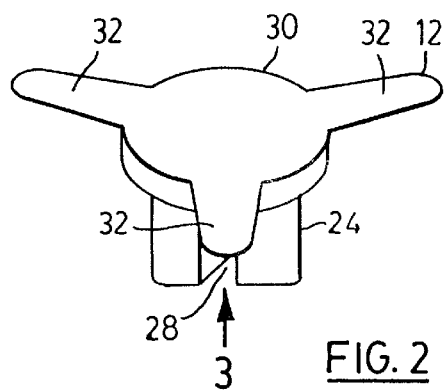
FIG. 2 is a perspective view of an anti-pilferage device used in the optical disc container of FIG. 1.
Figure 3:
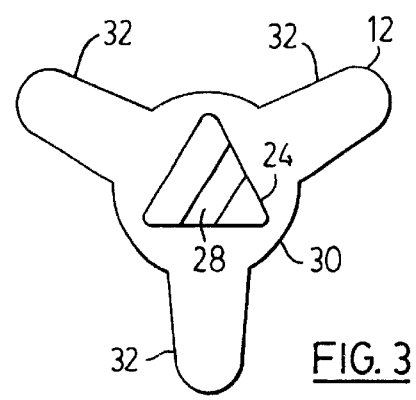
FIG. 3 is a bottom plan view of the anti-pilferage device of FIG. 2.
Figure 4:
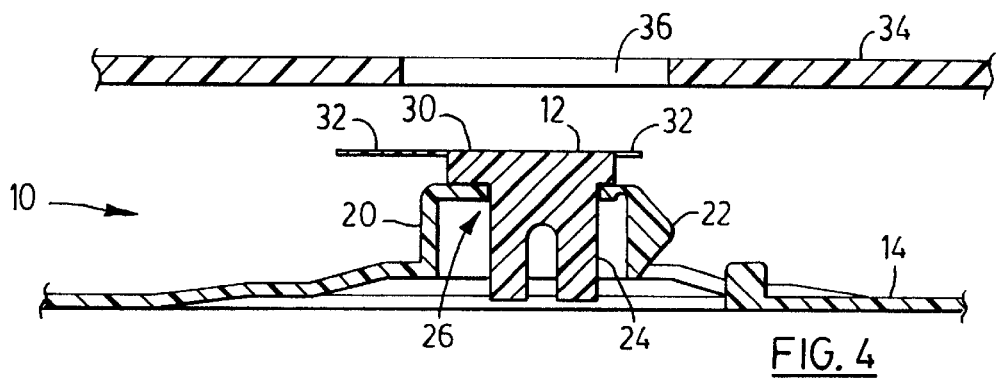
FIG. 4 is a partial sectional view taken along the line IV—IV in FIG. 1, showing an optical disc about to be mounted in the holder.

With reference to FIGS. 2 and 3, a preferred embodiment of the anti-pilferage device 12 of the present invention will be described in greater detail. In the illustrated embodiment, the anti-pilferage device 12 is a unitary structure formed from a resilient material such as polypropylene, and includes a shaft 24 which is configured to be slidably received within a corresponding opening that is provided through the top of the mounting hub 20. With reference to FIG. 4, the hole 26 that is provided through the mounting hub 20 and the anti-pilferage device shaft 24 are configured so that, after the shaft 24 is inserted into the hole 26, it frictionally engages the mounting hub 20 about the perimeter of the hole 26, thereby preventing the anti-pilferage device 12 from slipping out of the opening 26. Thus, the shaft 24 engages the hub 20 in a push-fit manner. With reference to the bottom plan view of the anti-pilferage device 12, shown in FIG. 3, in the illustrated embodiment the shaft 24 has a generally triangular cross-section, and the mounting hub opening 26 has a corresponding triangular cross-section. As shown in FIGS. 2 and 3, a lower portion of the shaft 24 can be conveniently divided into two parts by a upwardly-extending groove or channel 28 in order to facilitate insertion of the shaft 24 into the mounting hub opening 26.

A disc-like shaft head 30 is provided at an upper end of the shaft 24. Connected to and extending radially outward from the shaft head 30 are a plurality of fingers 32, which, as explained in greater detail below, function as engagement members for impeding movement of an optical disc that has become dislodged from the mounting hub 20. In the illustrated embodiment, the anti-pilferage device 12 includes three equally-spaced fingers 32, each of which is flexibly connected to the shaft head 30. In a preferred embodiment, the fingers 32 are of greater flexibility than the shaft head 30. This is accomplished by forming the flexible fingers 32 to have a smaller cross-sectional thickness than the shaft head 30 (such feature is easier seen in the cross-sectional illustrations of FIGS. 4–7). Such a configuration provides an anti-pilferage device which is resistant to damage, but which can still function in the manner noted below.

With reference to FIGS. 4–7, an example of the operation of the anti-pilferage device 12 in conjunction with an optical disc holder 10 will now be described. FIG. 4 is a cross-sectional view showing an optical disc 34 positioned above the mounting hub 20 of an optical disc case 10. The optical disc 34 is a conventional optical disc having a circular mounting aperture 36 located through its center. The anti-pilferage device 12 is mounted to the mounting hub 20, and in particular, the shaft 24 of the anti-pilferage device is slidably received within hub opening 26 such that the shaft 24 engages the circumference of opening 26. As noted above, the mounting hub 20 includes a plurality of mounting fingers 22 (which are not shown in the cross-section of FIG. 4) for engaging the optical disc 34 about the circumference of mounting aperture 36. In this regard, the mounting fingers 22 of mounting hub 20 define an outer circumference for engaging an inner circumference of the disc aperture 36.

Figure 5:
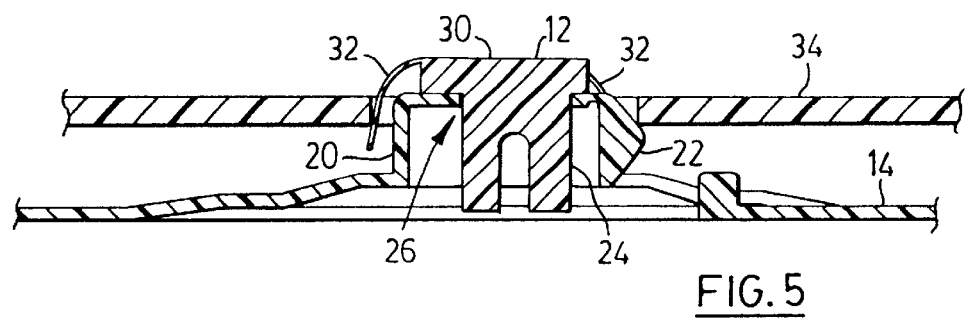
FIG. 5 is another view similar to FIG. 4 showing an optical disc being mounted in the holder.
Figure 6:
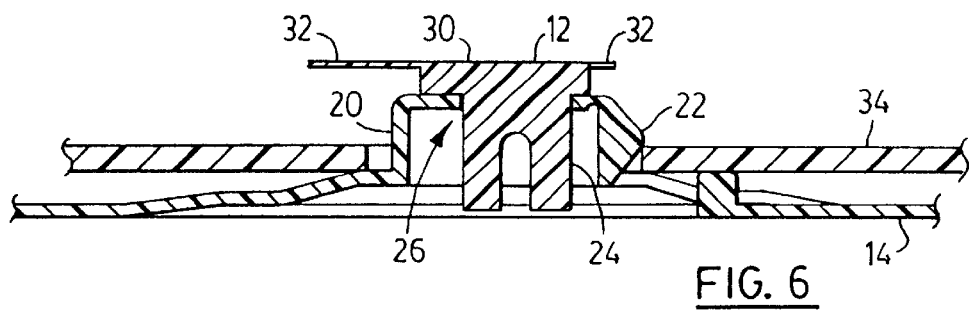
FIG. 6 is another view similar to FIG. 2 showing the optical disc mounted in the holder.

As can be seen in FIG. 4, in the illustrated embodiment, the anti-pilferage device shaft head 30 has a circumference which is less than that of the disc aperture 36. However, the anti-pilferage device fingers 32 define an outer circumference that is greater than the circumference of the disc aperture 36. In particular, the radial distance from the center of the shaft 24 to the outer end of each of the fingers 32 is greater than the radius of the disc aperture 36. As a result, so long as the anti-pilferage device 12 is attached to the mounting hub 20, the optical disc 34 cannot be mounted in, or removed from the holder 10 without displacing the anti-pilferage device fingers 32. As indicated in FIG. 5, the anti-pilferage device fingers 32 are preferably flexible, and in particular, are bendable towards the base 14 of the disc holder 10 so that the optical disc 34 can be slipped over the anti-pilferage device 12 onto the mounting hub 20. As indicated in FIG. 6, once the optical disc 34 has been mounted on the mounting hub 20, the resilient fingers 32 spring back up into their normal, radially-extending position such that portions of the disc 34 around its aperture 36 are located between the fingers 32 and base 14. Thus, the flexible fingers 32 are biased to extend radially from the shaft 24, but can be displaced to permit mounting of the optical disc 34. Preferably, the fingers 32 are short enough so that they will be released by the optical disc 34 when it is fully mounted on the hub 20.

Figure 7:
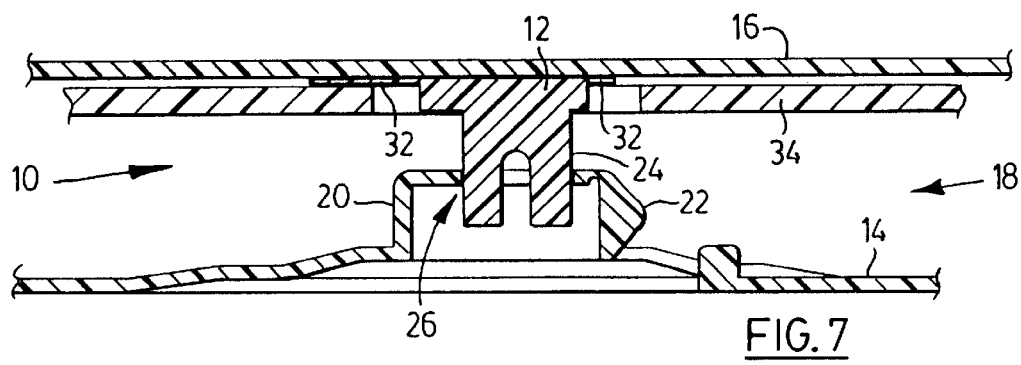
FIG. 7 is another view similar to FIG. 4, this time showing the optical disc holder in a closed position with the optical disc disengaged from a central hub of the disc case.

In order to remove the optical disc 34 from the holder 10, the process described above is reversed, with the fingers 32 bending away from the base 14 to permit the anti-pilferage device to pass through the mounting aperture 36 of the optical disc 34. However, in order to remove the optical disc, the optical holder 10 must be open. Otherwise, the optical disc holder cover 16 will prevent the fingers 32 from being displaced away from the base 14, thereby preventing the removal of the optical disc 34. With reference to FIG. 7, this feature will be explained in greater detail. FIG. 7 shows a partial sectional view of a closed optical disc holder 10 in which an optical disc 34 is located in the storage space 18 defined by the closed cover 16 and the base 14. In the example illustrated in FIG. 7, the optical disc 34 has been demounted or dislodged from the hub 20, perhaps inadvertently, or perhaps due to active steps taken by a potential thief. Although the disc has been dismounted from the hub, movement of the optical disc 34 in a direction parallel to the inner surface of cover is prevented by the anti-pilferage device 12. As indicated in FIG. 7, the shaft 24 of the anti-pilferage device 12 is sufficiently long that the anti-pilferage device 12 will come into contact with the cover 16 before disengaging from the mounting hub 20.

In FIG. 7, the disc 34 is shown as being completely dislodged from the central hub 20, and the shaft 24 partially pushed out from hub 20. In some instances, such as inadvertent movement of the disc relative to the hub 20, the upper end of the hub 20 may still be partially or fully within the aperture 36, but the disc 34 is demounted or disengaged from the hub in that the disc-engaging fingers 22 of the hub 20 are not securing the disc 34 in its normal storage position on the hub. The anti-pilferage device 12 functions to impede further movement of the demounted disc away from the hub 20 in such instances. Preferably, the fingers 32 are of sufficient length relative to the spacing between the closed cover and top of the hub 20 that, when the shaft 24 is fully inserted into the hub 26, upward bending of the fingers 32 towards the cover will result in the outer ends of the fingers 32 contacting the closed cover 16, thus preventing the optical disc 34 from being slipped over the fingers 32.

It will thus be appreciated that the anti-pilferage device 12 functions as a secondary disc engaging device in that it engages an optical disc after the optical disc has been disengaged from the primary disc engaging device, namely the central hub 20. As the anti-pilferage device functions to impede movement of the optical disc 34, it prevents the optical disc 34 from being manoeuvered to an edge of the disc case 10 and squeezed through a crack between the cover 16 and base 14 by a potential thief. Furthermore, by reducing the movement of an optical disc that has been dislodged from mounting hub 20, the anti-pilferage device 12 potentially reduces the possibility of damage to the optical disc surface.

In the above-described embodiment, the anti-pilferage device 12 is configured for push fit engagement with the mounting hub 20 and the anti-pilferage device 12 can be withdrawn from the mounting hub 20 when the holder cover 16 is in the open position, thus permitting an end user to have the option of removing and disposing of the device. The resilient, bendable nature of the anti-pilferage device arms 32 permit an optical disc 34 to pass over the anti-pilferage device 12 and be mounted on the optical hub 20 in one downward action. This permits the anti-pilferage device 12 to be used in conjunction with optical disc holders on existing disc insertion equipment.

In a further embodiment of the invention, the anti-pilferage device 12 is molded together with the mounting hub 20 such that the base 14 of the disc holder, the mounting hub 20, and the anti-pilferage device 12 are of unitary construction and formed of a resilient material.

In another embodiment of the invention, the anti-pilferage device is made of a rigid material such as general-purpose polystyrene. In such an embodiment, the shaft 24 of the device must be engaged with the mounting hub 20 after the disc 34 has been mounted on the optical hub 20 and furthermore the device 12 must be removed from the optical hub 20 before the optical disc 34 can be demounted from the hub 20.

Although the anti-pilferage device has been described as having three outwardly-extending arms 32, it will be appreciated that the device could be constructed with a single disc engagement member, or two fingers, or more than three fingers. Furthermore, the fingers could take a variety of different shapes, so long as they served as an effective physical barrier to the optical disc.

Other variations and modifications are possible. All such modifications or variations are believed to be within the scope of the invention as defined by the claims appended hereto.

I claim:
1. An optical disc case comprising:
an optical disc having a mounting aperture;
a base;
a cover movable relative to the base between a closed position in which a storage space for the optical disc is defined between the base and the cover, and an open position;
a mounting hub on the base receivable in the mounting aperture for engaging the optical disc to mount it within the disc case; and,
a disc engagement means having an inner portion secured to the mounting hub and an outer portion extending from the mounting hub and over the optical disc at the mounting aperture such that an inner periphery of the optical disc is located between the base and the engagement means, wherein the engagement means is formed of bendable resilient material and the outer portion is bendable towards the base and can pass through the aperture of the optical disc to permit mounting of the optical disc on the mounting hub, and wherein the engagement means can be bent away from the base to pass through the aperture of the optical disc to permit removal of the disc from the mounting hub when the cover is open.

2. The optical disc case of claim 1 wherein the engagement means is integrally molded with said mounting hub.

3. The optical disc case of claim 1 wherein the engagement means comprises a plurality of bendable engagement members, the engagement members defining an outer circumference that is larger than a circumference of the mounting aperture.

4. The optical disc case of claim 3 wherein the engagement members are uniformly spaced around the hub.

5. The optical disc case of claim 1 wherein the engagement member is biased to return to a radially extending position after being bent.

6. The optical disc case of claim 4 wherein the plurality of engagement members comprises at least three engagement members.

7. The optical disc case of claim 1 wherein the engagement means is formed of a plastic material.

8. The optical disc case of claim 7 wherein the plastic material is polypropylene.

9. An optical disc case for storing an optical disc having a central mounting aperture, the disc case comprising:
a base;
a cover movable relative to the base between a closed position in which a storage space for the optical disc is defined between the base and the cover, and an open position;
a mounting hub on the base receivable in the mounting aperture of the optical disc;
a path of travel around the hub for a circle of selected radius, wherein the mounting hub fits through the circle of selected radius; and,
a disc engagement means having an inner portion secured to the mounting hub and an outer portion, wherein the outer portion
extends substantially beyond the circle of selected radius to obstruct the path of travel when the disc engagement means is in a first position,
is displaceable from the first position to a second position wherein the outer portion fits within the circle of selected radius, and spans substantially less than the entire circumference of the circle of selected radius; wherein the path of travel is substantially unobstructed when the outer portion of the disc engagement means is displaced from the first position to the second position;

the engagement means is formed of bendable resilient material, and is bendable to move the outer portion from the first position to the second position;

the outer portion is displaced toward the base when the engagement means is moved from the first position toward the second position; and, the disc engagement means is displaceable away from the base from the first position to a third position wherein the outer portion fits within the circle of selected radius.

10. The optical disc case as defined in claim 9 wherein the cover in the closed position impedes movement of the disc engagement means from the first position to the third position.

11. The optical disc case as defined in claim 9 wherein the disc engagement means comprises a plurality of engagement members, wherein when the engagement members are in the first position, the outer portions of the engagement members extend to an outer circumference substantially larger than the circle of selected radius.

12. The optical disc case of claim 11 wherein the plurality of engagement members are uniformly spaced around the hub.

13. The optical disc case of claim 12 wherein the plurality of engagement members comprises at least three engagement members.

14. The optical disc case of claim 9 wherein the engagement means is formed of a plastic material.

15. The optical disc case of claim 13 wherein the plastic material is polypropylene.

16. The optical disc case of claim 9 wherein the engagement means is biased to return to the first position from the second position.

* * * * *